Feb. 10, 1942. W. J. BROWN ET AL 2,272,237
TIME CYCLE CONTROLLER
Filed Oct. 11, 1940 2 Sheets-Sheet 1

INVENTORS.
WILLIAM J. BROWN
EVAN A. EDWARDS
ERNEST J. HELDMANN
BY D. Clyde Jones
ATTORNEY.

Feb. 10, 1942. W. J. BROWN ET AL 2,272,237
TIME CYCLE CONTROLLER
Filed Oct. 11, 1940  2 Sheets-Sheet 2
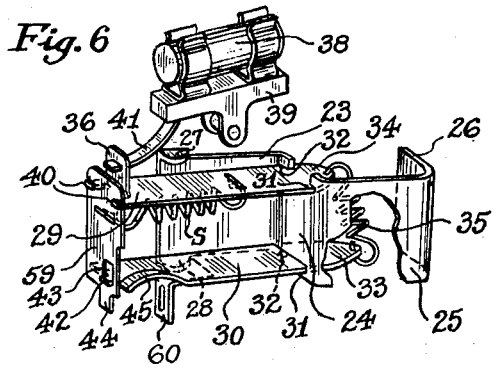
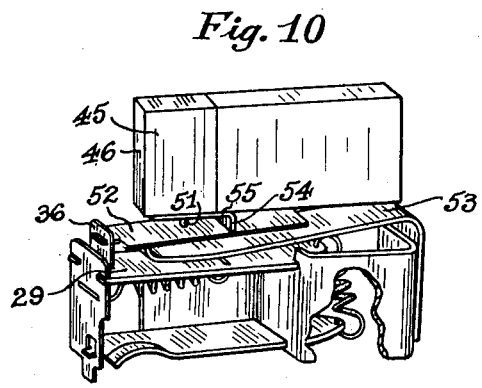
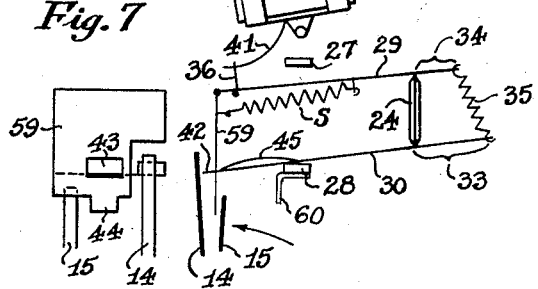
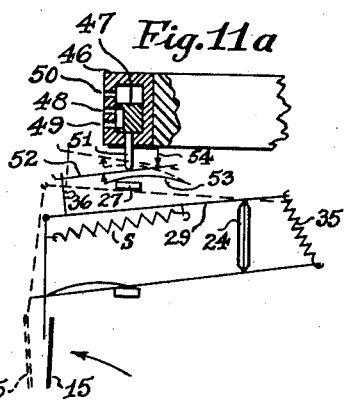
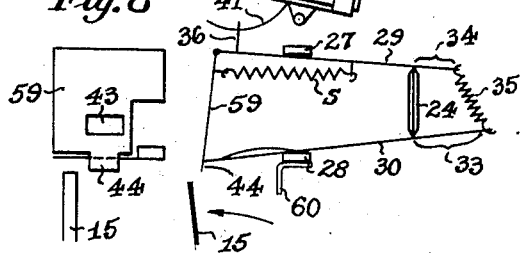
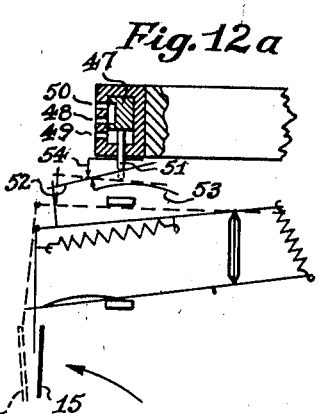
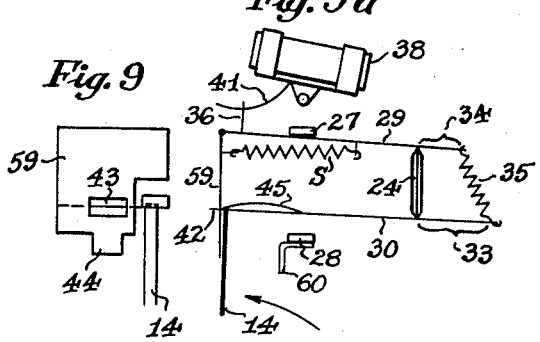
INVENTORS.
WILLIAM J. BROWN
EVAN A. EDWARDS
ERNEST J. HELDMANN
BY D. Clyde Jones
ATTORNEY.

Patented Feb. 10, 1942

2,272,237

UNITED STATES PATENT OFFICE 2,272,237

TIME CYCLE CONTROLLER

William J. Brown, Evan A. Edwards, and Ernest J. Heldmann, Rochester, N. Y., assignors to Taylor Instrument Companies, Rochester, N. Y., a corporation of New York Application October 11, 1940, Serial No. 360,822

3 Claims. (Cl. 161—1)

This invention relates to time cycle controllers.

In many industrial processes it is necessary to control the sequence and duration of a series of steps or operations involved therein. In order to effect this result, it is the practice to utilize a device known as a time cycle controller. Since the duration of the various steps or operations vary with different types of products, it is necessary that the controller be readily set by simple adjustments so that the process operations can be quickly varied at will. Such a controller must be reliable in operation, since the failure of the controller to establish the predetermined sequence and to measure accurately the duration of the several operations will result in defective products. Furthermore, the controller should be of simple construction so that it can be easily repaired since it is usually employed in connection with an expensive machine which is disabled if the controller fails.

In prior timing devices it has been customary to employ a cam and follower for actuating a switch or air relay during a desired interval. However, where such a cam is used it is necessary that the cam periphery be accurately profiled within close limits, if accurate timing results are to be obtained. Such accurate profiling of the cam is expensive and furthermore, it becomes necessary to provide a new cam whenever the time interval is to be changed. While it has been proposed to make adjustable cams to provide variable contours, such adjustable cams are expensive to make and are not always easy to adjust to a given time interval. In accordance with the present invention, it has been proposed to obviate the use of cams and to use instead, adjustable stop elements for releasing and restoring a trigger mechanism whereby a switch or relay is respectively moved to its open and closed position.

Figure 1:
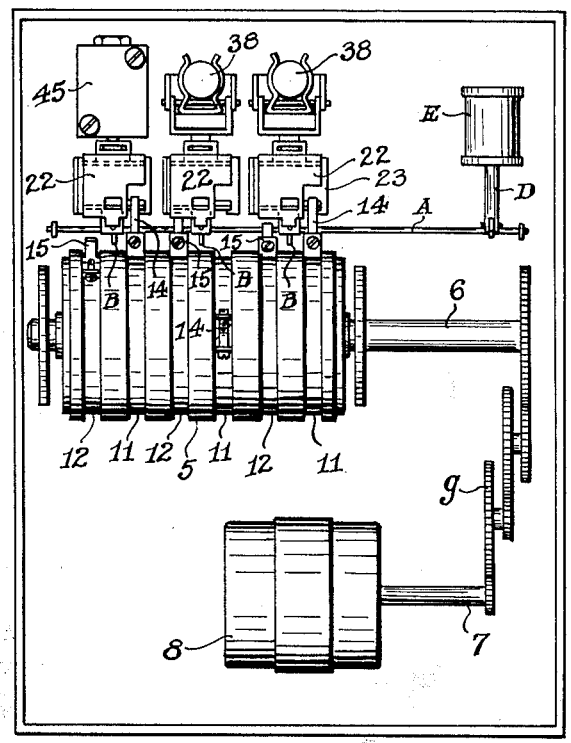
Figure 2:
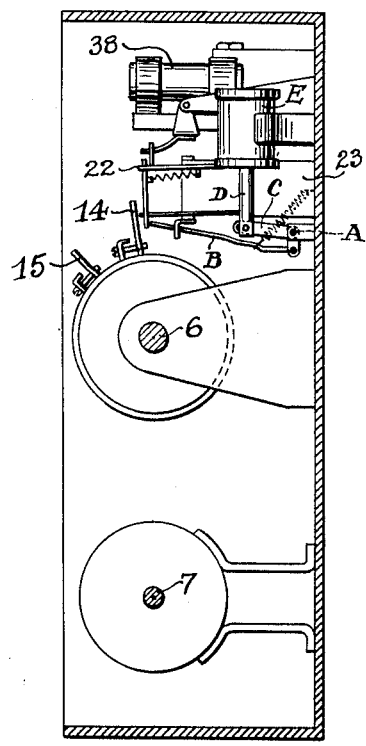
Figure 3:
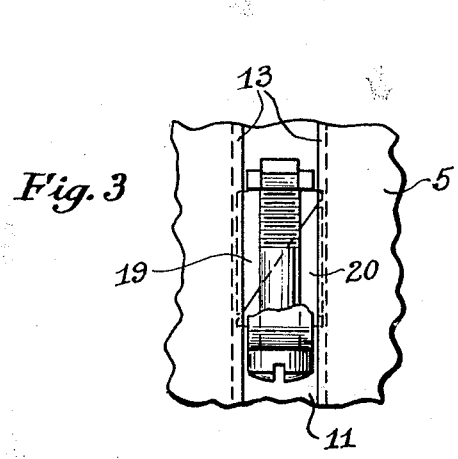
Figure 4:
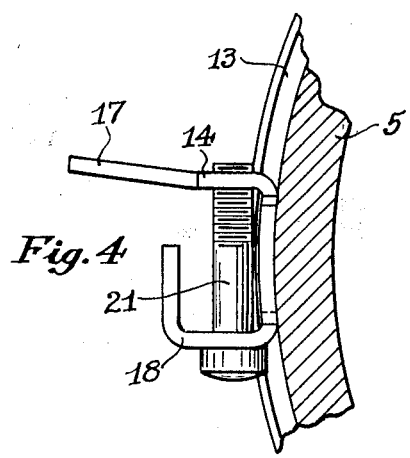
Figure 5:
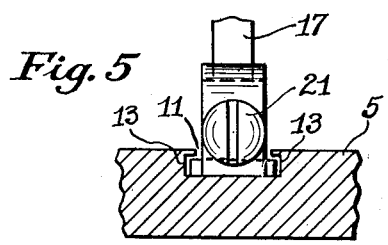

For a clearer understanding of the invention, reference is made to the drawings in which Fig. 1 is a front elevation of the timing device of the present invention; Fig. 2 is a side elevation thereof with the driving gears broken away; Figs. 3, 4 and 5 are fragmentary plan, side and end detail views, respectively, of the adjustable stop and a portion of a rotating drum illustrating the method of mounting the stops on the drum; Fig. 6 is a perspective view of the trigger or trip mechanism for operating and restoring a switch of the mercury bottle type; Figs. 7, 8 and 9 and Figs. 7a, 8a and 9a are diagrammatic end and side views illustrating the mechanism of Fig. 6 in its normal position, its tripped position and during the operation of being restored to normal; Fig. 10 is a perspective view of the trip mechanism in combination with a relay air valve to be actuated thereby; Figs. 11 and 11a are diagrammatic end and side views illustrating the mechanism of Fig. 10 in its normal position; and Figs. 12 and 12a are diagrammatic views illustrating the mechanism of Fig. 10 in its normal position but adjusted to give an action reverse from that shown in Fig. 11.

The timer of the present mechanism includes a constantly rotating drum 5 mounted on a suitable shaft 6. This shaft is driven through a train of gears $g$ by the shaft 7 of a suitable motor 8, preferably of the synchronous type.

The surface of the drum 5 is provided with a series of pairs of peripheral grooves 11 and 12, the lateral walls of which are preferably undercut as illustrated at 13 in Fig. 5. Each groove of the pair 11 and 12 has mounted therein an adjustable stop, groove 11 being provided with a stop 14 and the groove 12 with a stop 15. The stop 14 comprises two members, one having a long leg 17 and the other having a short leg 18. Each of these members has a wedge-shaped part, both parts respectively designated 19 and 20, being adapted to lie in the groove generally at right angles to the legs so that the inclined edges of these parts, mate. A bolt 21 passing through the short leg 18 and threaded into the long leg 17 is adapted to move the two members toward each other with the inclined edges of the parts 18 and 19 in engagement so that the outer edges of these parts are forced into engagement with the undercut edges 13 of the retaining groove. This adjustment locks the stop in the groove 11. The stop 15 is similar to the stop 14 in construction and mounting, except that the longer leg of the stop 15 is short as compared with the long leg 17 of the stop 14. It will be understood that the stops 14 and 15 may be adjusted along their respective grooves 11 and 12 to vary the angular displacement of these stops with respect to each other and thereby adjustably determine the timing interval to be measured.

The stops 14 and 15 respectively restore and release suitable trip mechanism shown in Figs. 5 and 10. This trip mechanism generally designated 22 inches a frame 23. This frame is made from strip material to have a right angular bracket portion 26 for attachment to the rear wall of the timer with the principal plane of the strip extending in a vertical direction. An intermediate or fulcrum part 24 of the strip is formed in spaced parallel relation to the portion 26, while the remaining parts 23 and 25 of the strip project toward the front of the timer in parallel offset relation to each other and at right angles to the bracket portion 26. The upper and lower edges of the free end of the part 23 are provided with horizontally projecting stops or ears 27 and 28 which extend from the front surface of this part as viewed in Fig. 6. The fulcrum part 24 is provided in its upper and lower edges with recesses 32 and 31. These recesses respectively receive and support an upper plate lever 29 and a lower plate lever 30. Each of these levers near the right hand ends thereof are provided with lateral notches to engage loosely the side walls of its related recess. This enables the plate levers to have limited swinging movement and yet prevents lengthwise movement thereof with respect to their mounting. The right-hand extension of the plate lever 29 beyond the fulcrum, is shorter than the corresponding extension of the plate lever 30, thus plate lever 29 has a lever arm 34 which is shorter than the lever arm 33 of the plate lever 30. The free ends of these lever arms are connected by a coil spring 35 which tends to draw together the right ends of the plate levers 29 and 30 thereby tending to cause the left ends of these levers to swing apart. The left ends of the levers terminate in a common vertical plane, the lever 29 terminating in spaced horizontal lugs 40 and a slotted upstanding lug 36. A latch plate 59 is supported for limited swinging movement on the lugs 40. As illustrated, the vertical edges of the latch plate are notched to receive the inner edges of these lugs and a coiled spring 5 having its ends respectively connected to the latch plate and to an intermediate part of the lever 29, retains these parts in engagement. It will be noted that the lower margin of the latch plate is slotted at 43 to receive a catch 42 projecting from the lower lever 30. The lower left edge of the latch plate projects into the path of the stop 15 while the lower right hand corner of this plate (Fig. 6) is cut away so that it clears the path of the stop 14. The upper lever 29 serves to open and close either an electrical switch or the like. As illustrated in Figs. 6 to 9 inclusive, the switch 38 is of the mercury bottle type mounted on a support 39 which is tiltable about a pivot carried by the frame of the timer. The support 39 is provided with an arm 41 having its free end inserted through the slot in the upstanding lug 36 on the lever 29. By this arrangement, as the lever 29 swings to its respective positions, the mercury bottle is tilted to corresponding positions to open and close the switch.

By reference to Fig. 6 wherein the trip mechanism is shown in normal latched position, it will be noted that the long lever arm 33 of the lower lever 30 under the influence of the spring 35 causes this lever to engage the ear or stop 28 while the upper lever 29 latched to the lever 30 by the latch plate 39 is held away from the ear or stop 27. This setting of these levers arises from the fact that the movement of the longer lever arm 35 about the fulcrum part 24 is considerably greater than corresponding movement of the shorter lever arm 34.

With the trip mechanism latched, the mercury switch 38 is held in the position shown in Figs. 6 and 7. However, in the course of the rotation of the drum 5, the leg of the stop 15 carried thereby, engages the lower left corner of the latching plate 39 (Fig. 1), and forces the latching plate to swing in a clockwise direction (Figs. 6, 7, 8 and 9), until the lug 42 of lever 30 is disengaged from the slot 43 in the plate. When the latch plate is unlatched, the free end of lug 42 on the plate lever 30 rests against the depending extension 44 of the latching plate, as shown in Fig. 8. Also when the tripping mechanism is unlatched, the left end of the lever will be lowered into engagement with the ear 27 and the left end of the lever 29 will be raised by the coil spring 35 to the position shown in Fig. 8, where this lever engages the upper ear 27. The lever 29 when thus raised, tilts the mercury switch 38 to the position shown in Figs. 8 and 9.

When the drum 5 has rotated through a given part of its cycle, the long stop 14 restores the trip mechanism 22 to its latched position. Therefore the angular displacement between the stop 15 and the long stop 14 determines the length of time which the mercury switch remains in a given tilted position such as shown in Fig. 8. It will be noted that the lower lever 30 is provided with a struck-up curved portion 45 providing clearance for the long leg 17 of the stop 14 during the major portion of its movement under the trip mechanism. However, by reference to Fig. 9 it will be noted that the stop 14 will engage the free end of the struck-up portion on lever 30, and will raise the left-end of this lever to a position where its projecting lug 42 will engage in the recess 43 of the latching plate. This arrangement provides a quick elevation of the lever 30. The coil spring S will first urge the latch plate against the end of the part 42 to latch the mechanism and when the long stop 14 moves clear of the lever 30, the spring 35 will cause the parts including the mercury switch 38 to assume again the position shown in Figs. 6 and 7.

While the device has been described and illustrated with but a single stop in each of the grooves 11 and 12 of the drum 5, it will be appreciated that a plurality of sets of stops, each set including a short stop and a long stop, may be provided to measure off a plurality of time intervals in each cycle whereby the mercury switch 38 may be opened and closed several times during each rotation of the drum.

In Figs. 10, 11 and 12, there is shown a slightly modified application of the trip mechanism wherein it is used to control the operation of an air relay valve 45. This relay valve 45 may be of the conventional construction including a body 46 having a plurality of ports communicating with a bore in the body, in which bore a plunger 47 is movable to connect an inlet port 48 with either an outlet port 49 or with an exhaust port 50. A stem 51 connected to the plunger engages the upper surface of a fulcrum strip 52 which has one of its ends projecting into the slot provided in the upstanding lug 36 of the lever 29 of the trip mechanism. An intermediate portion of the strip is held by a suitable leaf spring 53 against the downturned end 54 of a bracket 55 screwed to the bottom of the valve body. The trip mechanism of this application of the invention may be identical with that shown in Figs. 6 to 9 inclusive, the parts thereof corresponding to the parts of the above described trip mechanism being identified by similar reference characters. The bracket 55 is preferably secured to the valve casing in such a manner that its downturned end 54 may be disposed in the position shown in Figs. 10 and 11 or in the position shown in Fig. 12.

When the short stop 15 unlatches the trip mechanism shown in Fig. 10 to swing the plate 29 against the upper stop 27, the fulcrum strip 52 will raise the plunger from its normal position shown in Fig. 11 to its upper position as indicated by dotted lines. The trip mechanism is restored by means of the long stop 14 as in the case of the previously described modification of the trip mechanism so that the fulcrum strip will be lowered to its original position as shown in Figs. 10 and 11, the plunger being returned by gravity or by a spring (not shown).

By reference to Fig. 12 wherein the bracket 55 is reversed 180° from its position in Figs. 10 and 11, it will be noted that the fulcrum plate 48 maintains the plunger in its raised position when the trip mechanism is in normal latched condition. When the trip mechanism is unlatched the plunger will drop to the position indicated by dotted lines in Fig. 12. The restoration of the trip mechanism to its latched condition by means of the long stop 14 is effected in the manner already described.

In certain installations where the timer is used, it may be desirable to trip a plurality of switches or relays simultaneously. In the present arrangement this can be effected without utilizing the tripping stops 15. To effect this result a rod or shaft A extends along the back of the timer in parallel relation to the axis of the drum. The shaft A is provided with a downwardly extending arm positioned at the rear of each tripping mechanism. Each arm has pivoted thereto a rod B which is positioned just back of the latching plate in its last latched position, the rod being guided by a perforated bracket integral with the ear 28 (Fig. 6). It will be appreciated that when the shaft A is rocked in a clockwise direction, each of the rods B will engage its individual latch plate to disengage this plate from the retaining lug 42 on the lever 30. The means for rocking the shaft A includes an arm C projecting at right angles thereto. The free end of this arm is pivoted to the plunger D of a solenoid E. It will be understood that suitable circuit connections are provided for this solenoid so that on the depression of a push button (not shown), a plurality of latched plates on the timer will be released to correspondingly actuate a plurality of switches or air relays. It will be appreciated that the mounting of the several rods B is such that although they are simultaneously actuated by the solenoid E, these rods are easily deflected when their individual tripping mechanisms are latched down.

We claim:

1. A time cycle controller comprising a rotatable member, a pair of actuators carried by said member, a trip mechanism supported in operative relation to said actuators and comprising a support, a pair of spaced parallel members mounted for limited pivotal movement on said support, resilient means connecting said members at one side of said support, said resilient means being effective at an inclined angle to said support, means for latching said members together at the side of said support opposite said resilient means, one of said actuators being adapted to release said latching means, the other of said actuators being adapted to restore said latching means, and control means adjusted by said trip mechanism in its latched and unlatched positions.

2. In a trip and latch mechanism, a support, a pair of spaced levers fulcrumed on said support in superimposed relation for movement toward and away from one another, the lever arms at one side of said fulcrum being of unequal length and the lever arms at the other side of said fulcrum being of substantially equal length, resilient means biasing the free ends of said unequal lever arms toward each other, a latch mounted on the free end of one of said equal-length lever arms for releasably engaging the free end of the other of said equal-length lever arms, stops for limiting the movement of said last-mentioned arms away from each other, and means for releasing and reengaging said latch.

3. In a trip and latch mechanism, a support, a pair of spaced levers fulcrumed on said support in superimposed relation for movement toward and away from one another, the lever arms at one side of said fulcrum being of unequal length and the lever arms at the other side of said fulcrum being of substantially equal length, a coil spring connecting the free ends of said unequal lever arms biasing said ends toward each other, a latch mounted on the free end of one of said equal-length lever arms for releasably engaging the free end of the other of said equal-length lever arms, stops for limiting the movement of said last-mentioned arms away from each other, and means for releasing and reengaging said latch.

WILLIAM J. BROWN.
EVAN A. EDWARDS.
ERNEST J. HELDMANN.